(12) United States Patent
Nishiguchi et al.

(10) Patent No.: US 7,353,977 B2
(45) Date of Patent: Apr. 8, 2008

(54) FRICTIONAL JOINING METHOD AND FRICTIONAL JOINING STRUCTURE

(75) Inventors: Katsuya Nishiguchi, Hiroshima (JP); Yukihiro Sugimoto, Hiroshima (JP); Motoyasu Asakawa, Hiroshima (JP); Tomoyuki Iwashita, Hiroshima (JP); Kotoyoshi Murakami, Hiroshima (JP); Toshiyuki Gendou, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 274 days.

(21) Appl. No.: 10/863,216

(22) Filed: Jun. 9, 2004

(65) Prior Publication Data
US 2005/0035180 A1 Feb. 17, 2005

(30) Foreign Application Priority Data
Jul. 15, 2003 (JP) .............................. 2003-274983

(51) Int. Cl.
*B23K 20/12* (2006.01)
(52) U.S. Cl. ................................. 228/112.1; 228/233.1
(58) Field of Classification Search ............. 228/112.1, 228/2.1
See application file for complete search history.

(56) References Cited

U.S. PATENT DOCUMENTS

| 6,050,474 | A | 4/2000 | Aota et al. | |
| 6,601,751 | B2* | 8/2003 | Iwashita | 228/112.1 |
| 6,832,713 | B2* | 12/2004 | Kano et al. | 228/2.1 |
| 2001/0038028 | A1* | 11/2001 | Iwashita | 228/112.1 |
| 2001/0045447 | A1* | 11/2001 | Kano et al. | 228/112.1 |
| 2002/0158109 | A1* | 10/2002 | Gendoh et al. | 228/112.1 |
| 2002/0190100 | A1* | 12/2002 | Duncan, Jr. | 228/112.1 |
| 2003/0141343 | A1* | 7/2003 | Murakami | 228/112.1 |
| 2004/0041006 | A1* | 3/2004 | Masingale | 228/112.1 |
| 2004/0079787 | A1 | 4/2004 | Okamoto et al. | |
| 2004/0118900 | A1* | 6/2004 | Stevenson et al. | 228/114.5 |
| 2005/0092809 | A1 | 5/2005 | Murakami et al. | |
| 2007/0068993 | A1* | 3/2007 | Takase et al. | 228/101 |

FOREIGN PATENT DOCUMENTS

| EP | 1 153 694 A2 | 11/2001 |
| EP | 1 291 115 A2 | 3/2003 |
| JP | 10 328 855 | 5/1997 |

(Continued)

OTHER PUBLICATIONS

European Search Report Application No. EP 04 01 6335 dated Nov. 3, 2004.

*Primary Examiner*—Kiley Stoner
(74) *Attorney, Agent, or Firm*—Nixon Peabody LLP; Donald R. Studebaker

(57) ABSTRACT

An aluminum plate and a steel plate are lapped. A rotating tool is placed on the aluminum plate, and then a pressing force and a rotational force around a pressing axis of the rotating tool are applied to the aluminum plate and the steel plate. A zinc plating layer having oxidation-prevention function is formed on the surface of the steel plate in advance. When joining the both plates, an oxidation film formed on the aluminum plate is destroyed and the zinc plating layer is pushed out outward from a joining portion, by applying the above pressing force and frictional heat and plastic flow due to the rotation of the rotating tool. Thereby, respective new uncovered surfaces of the both plates are directly contacted.

10 Claims, 20 Drawing Sheets

FOREIGN PATENT DOCUMENTS

| | | |
|---|---|---|
| JP | 10 230 374 | 9/1998 |
| JP | 2001 314982 | 5/2000 |
| JP | 2002 066759 | 8/2000 |
| JP | 2001-314982 | 11/2001 |
| JP | 2002-066759 | 3/2002 |
| JP | 2004 167510 | 6/2004 |
| JP | 2004 167511 | 6/2004 |
| JP | 2006 136906 | 6/2006 |
| WO | WO 01/62430 A1 | 8/2001 |

* cited by examiner

10μm

10μm

10μm

10μm

10μm

FRICTIONAL JOINING METHOD AND FRICTIONAL JOINING STRUCTURE

BACKGROUND OF THE INVENTION

The present invention relates to a frictional joining method used for joining different kinds of metal members, and a frictional joining structure formed by the frictional joining method.

Conventionally, a frictional joining method is known as described in Japanese Laid-Open Patent Publication No. 2001-314982, in which the same kind of metal members are lapped, a rotating tool is placed on one of the same kind of metal members and a rotational force and a pressing force are applied to the rotating tool in such a manner that the rotational force is applied around a pressing axis of the rotating tool and the pressing force is applied toward the other of the metal members which is joined to the one of the metal members on which the rotating tool is placed. In this method, frictional heat is generated between the rotating tool and the metal members by pressing and rotation of the rotating toll, and the metal members are softened by the frictional heat, whereby the rotating tool is inserted into the softened metal members. Thereby, the rotating tool induces plastic flow in the metal members around a lapping face of the metal members, and consequently the lapped metal members are joined integrally at a joint spot of the lapping face. However, in a case where different kinds of metal members which are made of hard materials, such as steel, are applied, it is difficult for the rotating toll to induce such plastic flow in the metal members. As a result, enough joining strength can not obtained.

In light of this problem, a different joining method has been proposed recently as described in Japanese Laid-Open Patent Publication No. 2002-66759, in which an alloy is provided between the different kinds of metal members, and both of the metal members and the alloy are diffused into each other by the frictional heat and the plastic flow generated by the rotation of the rotating tool. Thereby, the different kinds of metal members are joined integrally by the use of the alloy.

However, although the latter joining method shows some improved joining strength compared to the former joining method, it is still not enough. Because, a material strength of the alloy itself is not so high, and therefore the joining strength of the metal members with the alloy may not improve sufficiently in total.

SUMMARY OF THE INVENTION

The present invention has been devised in view of the above-described problems, noticing that existence of an oxidation film deteriorates the joining strength of metal members, and an object of the present invention is to provide a frictional joining method that can improve the joining strength of lapped different kinds of metal members. Another object of the present invention is to provide a frictional joining structure that can improve the joining strength of lapped different kinds of metal members.

These objects are solved according to the present invention by a frictional joining method of claims 1 or 14, and by a frictional joining structure of claims 12 or 17. Preferred embodiments are subject of the dependent claims of these claims.

According to claim 1 of the present invention, there is provided a frictional joining method, in which different kinds of plural metal members are joined by lapping the metal members, comprising the steps of providing the different kinds of plural metal members to be joined, forming a metal film having oxidation-prevention function on a surface of at least one of the metal members which constitutes a joining face between the metal members, lapping the metal members in such a manner that the metal film having oxidation-prevention function is located at the joining face between the metal members, placing a rotating tool on an outside surface of a lapped portion of one of the metal members, joining the metal members by applying a rotational force and a pressing force to the rotating tool, the rotational force being applied around a pressing axis of the rotating tool, the pressing force being applied toward another of the metal members which is joined to the one of metal members on which the rotating tool is placed, wherein the step of joining the metal members includes a step of softening the metal film having oxidation-prevention function located at the joining face between the metal members by the use of frictional heat generated by a rotation of the rotating tool, and a step of pushing out the softened metal film having oxidation-prevention function outward by the use of the pressing force applied to the rotating tool, whereby the metal members are joined in a solid state substantially without the metal film having oxidation-prevention function at the joining face between the metal members.

Accordingly, by providing a state in which no oxidation film exists at the joining face between the different kinds of metal members, each joining face of the metal members to be joined is formed of its metal material itself. As a result, the different kinds of metal members are contacted and joined directly without any oxidation film therebetween. Namely, the metal film having oxidation-prevention function has been formed in advance on the surface of at least one of the metal members at the joining face between the metal members, and thereby no or little oxidation film exists at the joining face between the metal members. Then, the metal film having oxidation-prevention function which has been provided to prevent the oxidation film from generating is eliminated substantially by the operation of the rotating tool so that the metal members are joined in a solid state substantially without the metal film having oxidation-prevention function and even oxidation film at the joining face between the metal members. Therefore, this can more accelerate atomic diffusion between the different kinds of metal members, compared to the conventional case where there exists some oxidation film which may be formed due to frictional heat caused by the rotating tool or the like, thereby improving joining strength of solid joining of the different kinds of metal members.

Further, such direct contact of the different kinds of metal members can be materialized by utilizing the pressing force of the rotating tool and the frictional heat and the plastic flow, which are generated by the rotation of the rotating tool, for eliminating the metal film having oxidation-prevention function. Also, such frictional heat and plastic flow can be also used properly for accelerating an atomic diffusion between the metal members (improvement of joining strength of solid joining) after the above-described state is obtained.

Additionally, since the metal member with the metal film having oxidation-prevention function is used, there is substantially no need to consider a lapse of work time. Accordingly, the frictional joining method according to the present invention can be executed at any time by stoking such metal members to be joined as works, thereby improving facilitation of the friction joining method as well.

According to a preferred embodiment, above-described another of metal members has a relatively higher melting point than that of above-described one of metal members on which the rotating tool is placed, and the metal film having oxidation-prevention function is formed on the another of metal members and its melting point is lower than that of the another of metal members.

According to a further preferred embodiment, the melting point of the metal film is lower than that of the one of metal members.

Accordingly, since the metal member with a higher meting point is configured of a metal member which is joined to the metal member on which the rotating tool is placed, the pressing force of the rotating tool can be sustained preferably by this metal member with the high melting point without being softened improperly due to the frictional heat by the rotation of the rotating tool. Meanwhile, since the metal film having oxidation-prevention function has a lower melting point than that of the metal member on which the rotating tool is placed, softening the metal film can be attained certainly due to the frictional heat and thereby the softened metal film can be pushed out smoothly outward from a joining portion due to the pressing force of the rotating tool and the frictional heat and the plastic flow by the rotation of the rotating tool. Accordingly, the direct contact of the different kinds of metal members can be materialized certainly, and by utilizing the pressing force of the rotating toll and the frictional heat and the plastic flow by the rotation of the rotating tool, the joining strength of solid joining of the lapped different kinds of metal members can be improved.

According to another preferred embodiment, the metal film is further formed on above-described one of metal members.

Accordingly, since the metal films having oxidation-prevention function are formed on the both metal members, the deterioration of joining strength due to existence of the oxidation film can be prevented certainly.

According to another preferred embodiment, the above-described one of metal members is made of aluminum and the above-described another of metal members is made of steel.

For this kind of specific metal members, substantially the same functions and effects described above can be obtained certainly.

According to a further preferred embodiment, the metal film is formed on the above-described another of metal members made of steel.

Accordingly, as described above, the pressing force of the rotating tool can be sustained preferably by the steel member with the high melting point without being softened improperly due to the frictional heat by the rotation of the rotating tool. Further, softening the metal film formed on the steel member can be attained certainly and thereby the softened metal film can be pushed out smoothly outward from the joining portion.

According to a further preferred embodiment, the metal film is not formed on the above-described one of metal members made of aluminum.

Herein, since the aluminum member has no metal film having oxidation-prevention function formed thereon, some oxidation film may be formed on the surface of the aluminum member (generally, oxidation film is formed under normal conditions). However, such oxidation film on the aluminum member is easily destroyed into small pieces by the pressing force of the rotating toll and the plastic flow generated by the rotation of the rotating tool or the like, and part of the destroyed oxidation film is pushed out outward from the joining portion. Meanwhile, the metal film having oxidation-prevention function on the steel member can be softened and pushed out outward from the joining portion due to the pressing force of the rotating tool and the frictional heat and the plastic flow by the rotation of the rotating tool. Accordingly, similarly the direct contact of the aluminum member and the steel member can be obtained, and the joining strength of solid joining of these members can be improved by utilizing the pressing force of the rotating toll and the frictional heat and the plastic flow by the rotation of the rotating tool.

According to another preferred embodiment, the metal film having oxidation-prevention function is formed of a zinc-based plating layer.

Using this specific metal film of zinc-based plating layer, substantially the same functions and effects described above can be obtained.

According to another preferred embodiment, the rotating tool includes a substantially cylindrical body portion and a pin portion which protrudes from a center of a tip of the body portion and has centering function, and there is provided a concave at an end surface of the tip of the body portion such that a depth of the concave is deeper at its central portion.

Accordingly, the pressing force of the rotating toll acts on the metal film having oxidation-prevention function effectively so that the softened metal film can be pushed out outward from the joining portion. Namely, since the concave is provided such that its depth is deeper at its central portion, the metal material (aluminum) of the soften metal member (above-described one of metal members, for example, aluminum member), which is made soft and in plastic flow by the frictional heat, can be preferably prevented from leaking outward from the rotting toll. Thereby, the pressing force of the rotating toll can be made act on the metal film effectively.

According to another preferred embodiment, the pressing force of the rotating tool is adjusted by a pressing stroke of the rotating tool which is moved toward the above-described another of metal members, and the step of pushing out the softened metal film outward is executed by increasing the pressing stroke more than that in the step of softening the metal film.

Accordingly, the above-described functions and effects according to the present invention can be attained certainly by a simple control of the rotating tool.

According to another preferred embodiment, an oxidation film which has been formed on a surface of the above-described one of metal members which constitutes the joining face between the metal members is destroyed due to an operation of the rotating tool in the step of joining the metal members, whereby the metal members are joined in a solid state substantially without the metal film having oxidation-prevention function and any oxidation film at the joining face between the metal members.

Accordingly, the oxidation film which has been formed on the one of metal members (under normal conditions) is destroyed effectively by the operation of rotating tool and thereby is eliminated substantially from the joining face. Thus, the metal members can be joined certainly in the solid state.

According to claim 12 of the present invention, there is provided a frictional joining structure, in which different kinds of plural metal members are joined, formed by the above-described frictional joining method.

Further, as a preferred embodiment, there is provided a frictional joining structure comprised of an aluminum member and a steel member.

According to claim 14 of the present invention, there is provided a frictional joining method, in which different kinds of plural metal members are joined by lapping the metal members, comprising the steps of providing the different kinds of plural metal members to be joined, wherein the plural metal members to be joined comprises one of metal members and another of metal members, removing an oxidation film which has been formed on a surface of the another of metal members which constitutes a joining face between the metal members, lapping the above-described one of metal members and the above-described another of metal members from which the oxidation film has been removed, placing a rotating tool on an outside surface of a lapped portion of the above-described one of metal members, joining the metal members by applying a rotational force and a pressing force to the rotating tool, the rotational force being applied around a pressing axis of the rotating tool, the pressing force being applied toward the above-described another of metal members which is joined to the one of metal members on which the rotating tool is placed, whereby the metal members are joined in a solid state substantially without any oxidation film at the joining face between the metal members.

Accordingly, a state has been already provided where substantially no oxidation film exists at the joining face when lapping and joining the metal members. Thus, like the method of claim 1, the direct contact of the different kinds of metal members can be materialized, and by utilizing the pressing force of the rotating toll and the frictional heat and the plastic flow by the rotation of the rotating tool, the joining strength of solid joining of the lapped different kinds of metal members can be improved.

According to a preferred embodiment, the above-described one of metal members is made of aluminum and the above-described another of metal members is made of steel.

For this kind of specific metal members, substantially the same functions and effects described above can be obtained certainly.

According to another preferred embodiment, an oxidation film which has been formed on a surface of the above-described one of metal members which constitutes the joining face between the metal members is destroyed due to an operation of the rotating tool in the step of joining the metal members, whereby the metal members are joined in a solid state substantially without any oxidation film at the joining face between the metal members.

Accordingly, the oxidation film which has been formed on the one of metal members (under normal conditions) is destroyed effectively by the operation of rotating tool and thereby is eliminated substantially from the joining face. Thus, the metal members can be joined certainly in the solid state.

According to claim 17 of the present invention, there is provided a frictional joining structure, in which different kinds of plural metal members are joined, formed by the above-described frictional joining method.

Further, as a preferred embodiment, there is provided a frictional joining structure comprised of an aluminum member and a steel member.

DETAILED DESCRIPTION OF THE INVENTION

Hereinafter, preferred embodiments of the present invention will be described with reference to the accompanying drawings.

Firstly, a specific structure of a joining apparatus used for a joining method according to the present invention will be described before describing the joining method.

Figure 1:
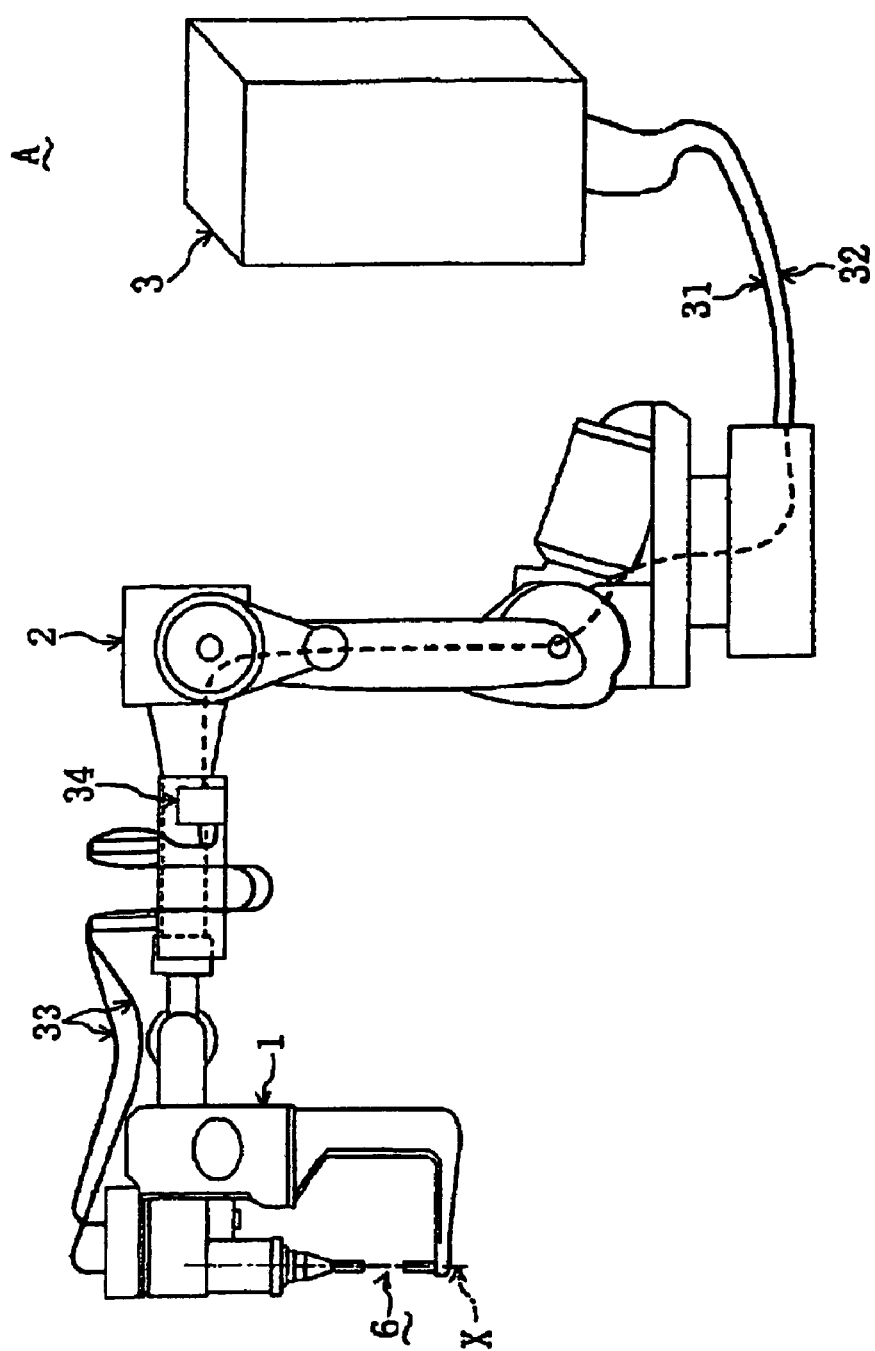
FIG. 1 is a schematic diagram showing a structure of a joining apparatus according to an embodiment.

FIG. 1 shows schematically a structure of a joining apparatus A according to a first embodiment of the present invention, in which an aluminum plate (one of metal members) W1 made of an aluminum alloy and a steel plate (another of metal members) W2 are used as metal members W which constitutes, for example, a vehicle body or the like, and the both plates are lapped and joined. The joining apparatus A includes a robot 2, a joining gun 1 attached to an arm tip of the robot 2, and a control unit 3 to control these.

The robot 2 may be configured of, for example, a six-axis multiple-articulated type of robot which has been used widely, which has function of positioning the joining gun 1 at a joining portion between the aluminum plate W1 and the steel plate W2.

Figure 2:
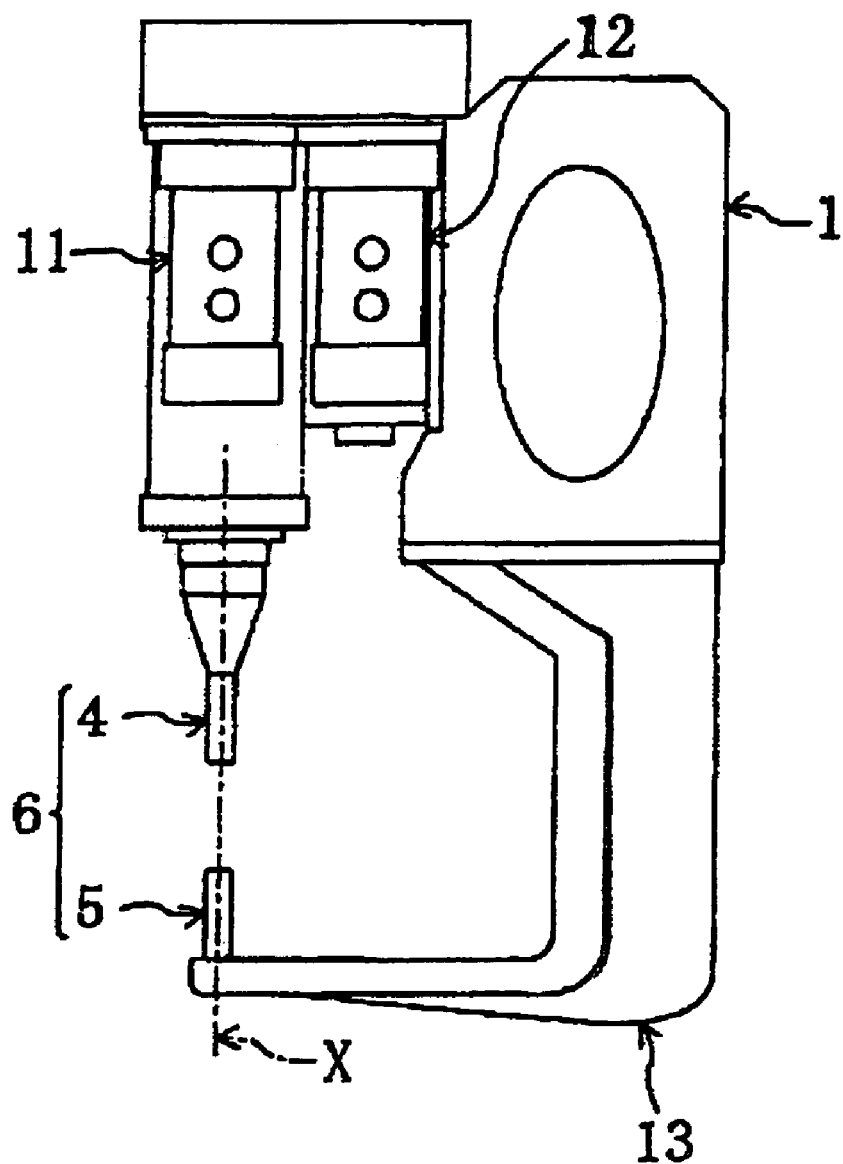
FIG. 2 is a schematic diagram showing a structure of a joining tool according to the embodiment.

The joining gun 1 includes a rotating toll 4 and a receiving toll 5 as a joining tool 6 thereof for joining the aluminum plate W1 and the steel plate W2, as shown in FIG. 2. The rotating toll 4 is disposed on a joining axis X, which is controlled by a pressing axis motor 12 so as to move up and down for pressing along the joining axis X and controlled by a rotating axis motor 11 so as to rotate around the joining axis X. The rotating axis motor 11 may be configured of an induction motor or a servomotor, while the pressing axis motor 12 may be configured of a servomotor. The receiving member 5 is disposed so as to face to the rotating tool 4 and be maintained in its specified position by a substantially L-shaped arm 13. The receiving member 5 is attached at a tip of the arm 13. Herein, the rotating tool 4 and the receiving member 5 are detachably attached at the joining gun 1.

Figure 3:
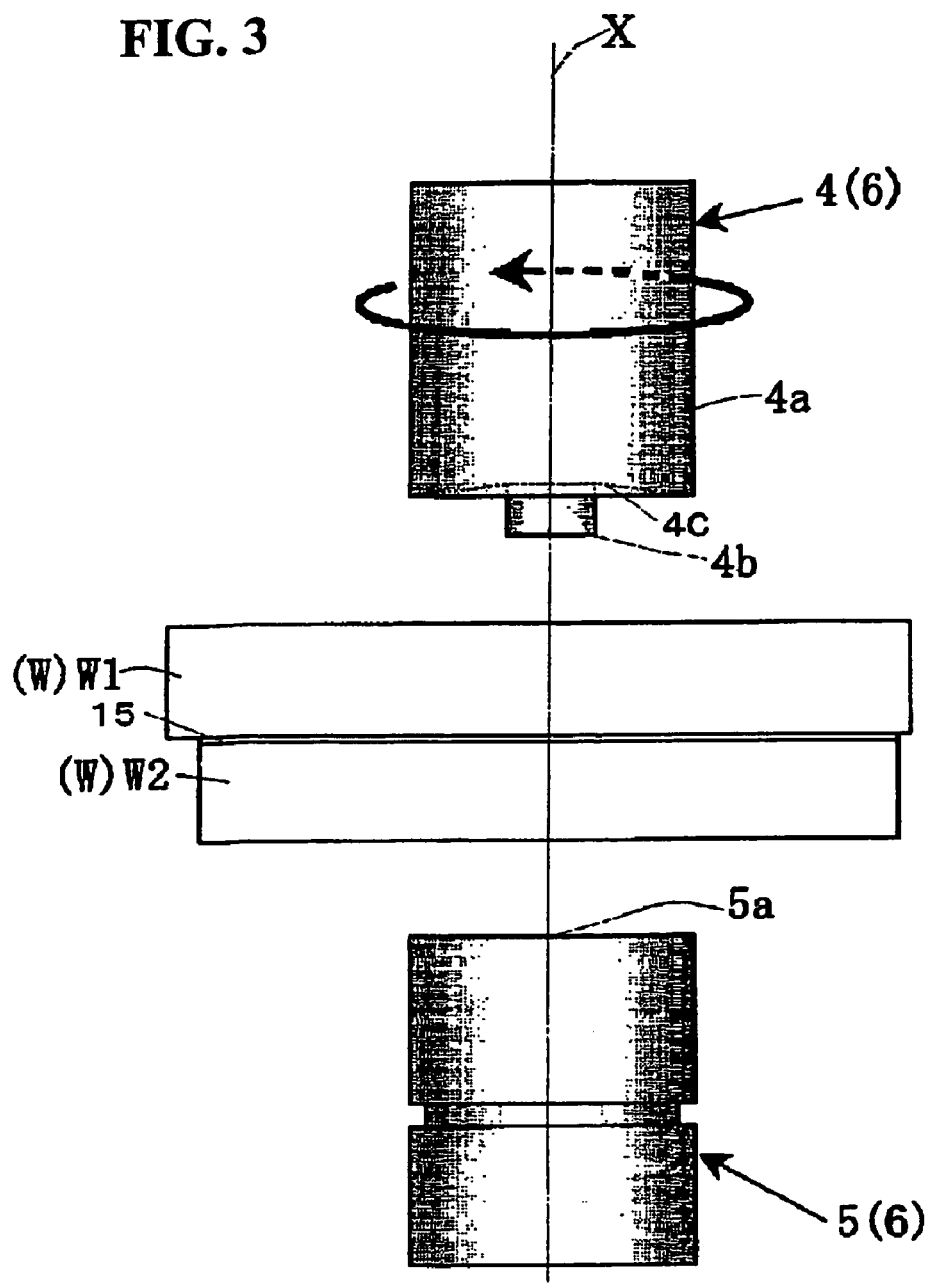
FIG. 3 is a diagram showing a joining tool according to the embodiment.
Figure 4:
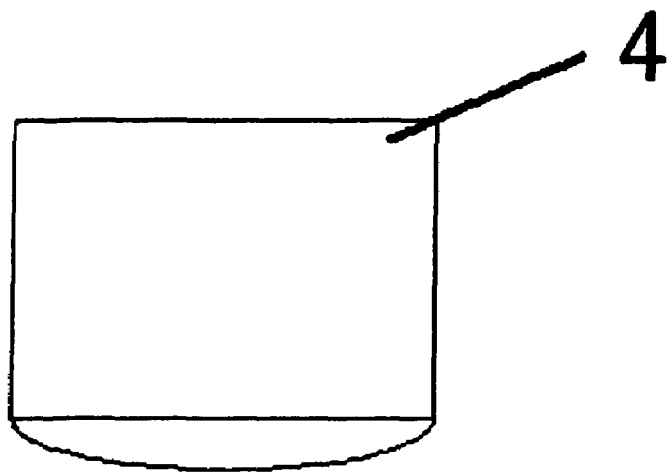
FIG. 4 is a diagram showing a modified rotating tool.
Figure 5:
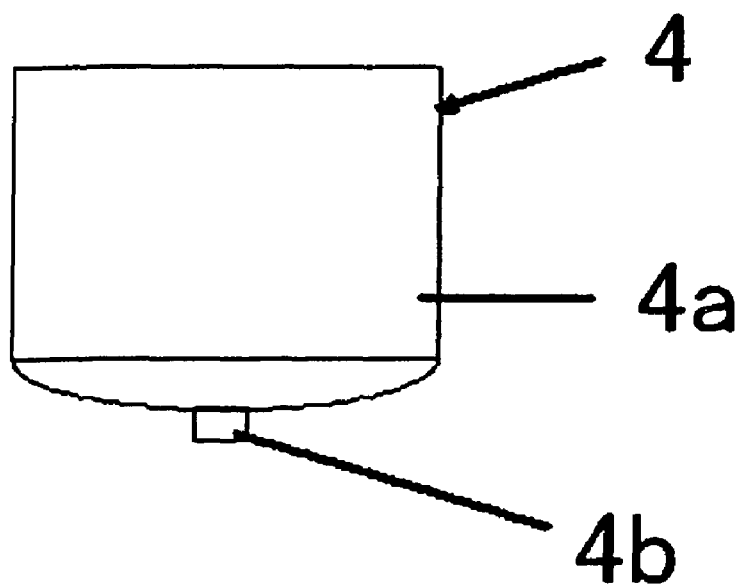
FIG. 5 is a diagram showing a further modified rotating tool.

The rotating toll 4 and the receiving member 5 of the joining gun 1 will be specifically described referring to FIG. 3. The rotating toll 4 includes a body portion 4a, and a pin portion 4b for the purpose of centering (positioning function, anti-slippage function) which are formed integrally. The body portion 4a is of substantially cylindrical shape, and is so located that its axis can be on the above-described joining axis. There is provided a concave portion 4c at an end surface of a tip of the body portion 4a, which is relatively shallow in total and deeper at its central portion. The pin portion 4b is also so located that its axis can be on the axis of the body portion 4a (joining axis), and the pin portion 4b protrudes from the tip end surface of the body portion 4a with its smaller diameter than that of the body portion 4a and with its flat end surface. Herein, the caricature radius of the concave 4c is set preferably at approximately 40 mm, thereby generating a centripetal force properly to make the rotating tool 4 to be inserted smoothly. Of course, any other modified rotating toll 4 can be used, such as one having a cylindrical shape in total and its flat end, one having a cylindrical shape in total and its curved peripheral-edge end (see FIG. 4), or one having a cylindrical shape in total and its curved peripheral-edge end and a protruded portion 4b (see FIG. 5).

Herein, it is more preferred that a shape of the concave 4c is configured such that a depth of the concave is deeper at its central portion, as described above. Namely, the rotating toll also functions, when pressing, to soften a metal film having oxidation-prevention function, which is provided for the present invention, and push out the softened metal film outward, which will be described below. Here, the concave 4c having the above-described shape is more preferable in performing this function. Namely, this concaved shape can preferably prevent a metal material of the metal member (for example, aluminum member) which is made soft and in plastic flow by frictional heat from leaking outward from the rotting toll. Thereby, the pressing force of the rotating toll can be made act on the metal film having oxidation-prevention function effectively, thereby pushing out the metal film smoothly.

The receiving member 5 is also of a substantially cylindrical shape, which has approximately the same diameter as the body portion 4a of the above-described rotating tool 4, and its end face 5a is formed as a flat face.

The control unit 3 is coupled, as shown in FIG. 1, to the robot 2 via a harness 31 and also coupled to the joining gun 1 via a harness 33, a junction box 34 and a harness 32. The control unit 3 is configured so as to perform a synchronous eight-axis control including the six-axis control for the robot and additionally two-axis controls for the rotating axis motor 11 and the pressing axis motor 12 of the joining gun 1.

Next, a joining method of the metal members W using the above-described joining apparatus A will be specifically described. This joining method is available for different kinds of metal members as metal members W to be joined which have different hardness from each other in particular. In the present embodiment, the metal members W to be joined are, as described above, the aluminum plate W1 (including an aluminum alloy plate) (defined as one of metal members in claims) and the steel plate W2 (defined as another of metal members in claims). A zinc plating layer (oxidation-prevention film) 15 as a zinc-based plating layer (including a zinc-alloy plating layer) for preventing an oxidation film from generating is formed on a joining face of the steel plate W2 in advance in a previous working step. Meanwhile, in the present embodiment, no oxidation-prevention film is formed on the aluminum plate (no step to actively form oxidation-prevention film is conducted), and therefore a normal oxidation film ($Al_2O_3$) which would be generated under normal circumstances may be formed on a joining face of the aluminum plate.

At first, the aluminum plate W1 and the steel plate W2, which are to be joined, are fixed in specified positions and under specified conditions. This is executed by setting the aluminum plate W1 and the steel plate W2 at a fixing member (not illustrated) which is fixed at a specified portion in an operating area of the robot 2, in which respective joining faces of the aluminum plate W1 and the steel plate W2 are lapped and the zinc plating layer 15 formed on the steel plate W2 is located between respective joining portions of these plates W1, W2.

Next, the robot 2 moves the joining gun 1 to approach to a specified joining portion as shown in FIG. 3. Namely, the robot 2 moves the joining gun 1 such that the receiving member 5 faces to the steel plate W2 and the joining portion of the metal members W is located between the receiving member 5 and the rotating tool 4, thereby locating the joining portion of the metal members W just on a joining axis X of the joining gun 1. Then, the joining gun 1 is moved such that the end face 5b of the receiving member 5 contacts the steal plate W2.

Figure 6:
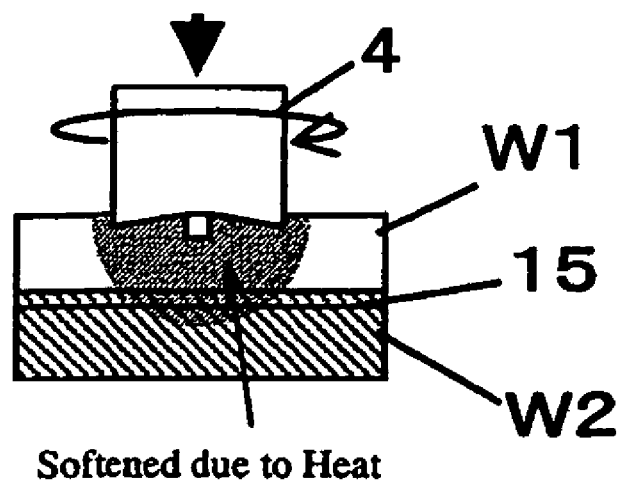
FIG. 6 is a diagram showing a joining process subsequent to a state shown in FIG. 3.

Subsequently, the metal members W, as shown in FIG. 6, are held by the end face of the rotating tool 4 in rotation and the receiving member 5. Namely, the rotating tool 4 is moved to the receiving member 5, maintaining its rotation around the joining X. Then, the pin portion 4b of the rotating tool 4 contacts immediately the aluminum plate W1 to provide locating first, and subsequently a tip of the body portion 4a contacts it. In this way, the metal members W are held by the end face of the rotating tool 4 and the receiving member 5. Herein, frictional heat is generated between the aluminum W1 having a relatively low melting point and the rotating tool 4, and the aluminum W1 is softened by the frictional heat.

Figure 7:
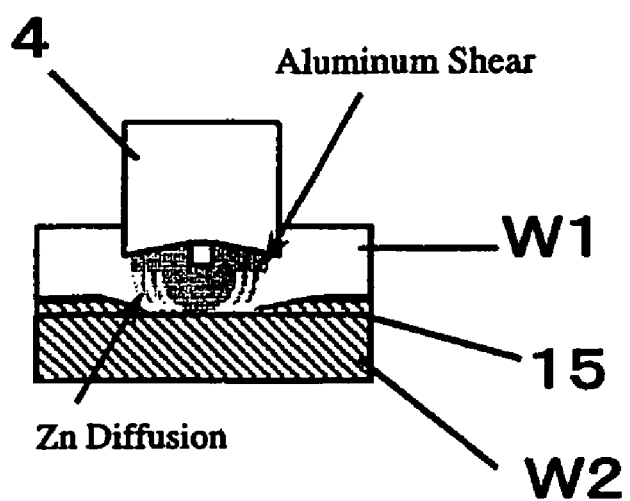
FIG. 7 is a diagram showing a joining process subsequent to a state shown in FIG. 6.

Subsequently, the rotating tool 4 in rotation is further moved to the receiving member 5, which proceeds so as to be inserted into the softened aluminum plate W1 as shown in FIG. 7. Accordingly, part of the aluminum plate which contacts the rotating tool 4 with a high contacting pressure is sheared by the rotation of the rotating tool 4, and the zinc plating (zinc plating layer) softened by the frictional heat is diffused into this sheared portion of the aluminum plate.

Figure 8:
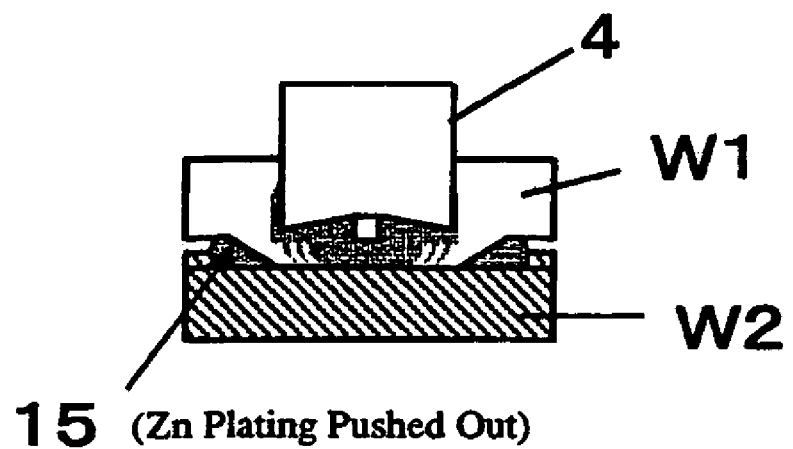
FIG. 8 is a diagram showing a joining process subsequent to a state shown in FIG. 7.

Then, as shown in FIG. 8, the aluminum plate W1 is plastic-deformed by further pressing (insertion) of the rotating tool 4, and the sheared portion expands outward. Concurrently, the zinc plating layer 15 remaining at the boundary face between the aluminum plate W1 and the steel plate W2 is also pushed out outward. Herein, there exists the oxidation film (Al$_2$O$_3$) on the surface (joining face) of the aluminum plate W1. However, since it has easily-broken characteristics, the oxidation film is destroyed into small pieces due to the above-described plastic deformation (plastic flow). Accordingly, a new uncovered surface (aluminum face without the oxidation film) appears on the aluminum plate W1.

Figure 9:
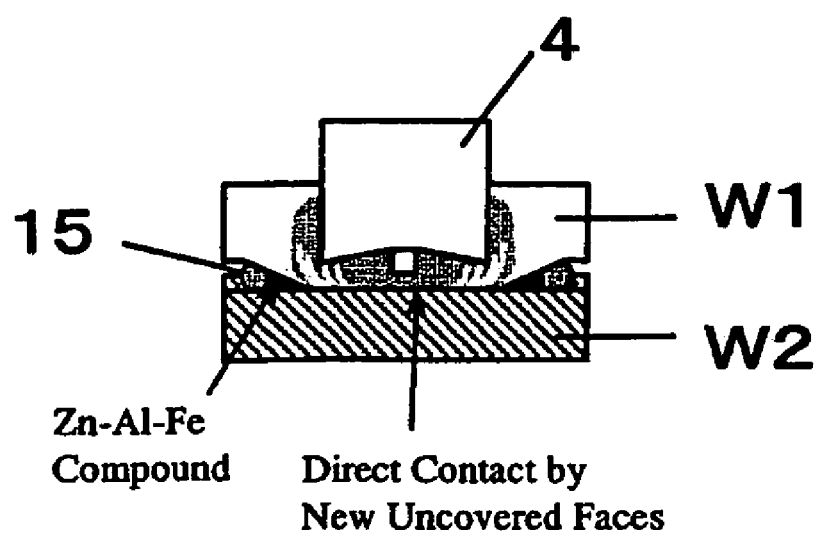
FIG. 9 is a diagram showing a joining process subsequent to a state shown in FIG. 8.

Next, although part of the zinc plating layer 15 on the steel plate W2 is incorporated into the aluminum as shown in FIG. 9, most part thereof is pushed out outward by the pressing force of the rotating tool 4. Accordingly, the above-described new uncovered surface of the aluminum plate W1, where the oxidation film has been destroyed away, and a new uncovered surface of the steel plate W2, where the zinc plating layer 15 has pushed away, come to directly contact (join). Herein, the aluminum plate W1 and the steel plate W2 are joined by zinc-aluminum-ferroalloy at a periphery portion thereof where some zinc plating layer 15 remains.

After a specified period of time has passed from the above point, the rotating tool 4 and the receiving member 5 are moved away respectively from the metal members W to prepare for the following working steps.

Accordingly, in the above-described joining method, the new uncovered surface of the aluminum plate W1 appears (destroy of the oxidation film) by the use of the rotating toll 4, and subsequently the zinc plating layer 15 is pushed out immediately due to the pressing force, frictional heat and plastic flow by the rotating too 4 to provide the new uncovered surface of steel plate W2. Thereby, respective new uncovered surfaces of the aluminum plate W1 and the steel plate W2 contact each other directly substantially without any generation of oxidation thereof. Accordingly, the joining (frictional joining) is executed under this condition, namely both of the aluminum plate W1 and the steel plate W2 are joined in a direct solid state substantially without any oxidation-prevention metal film (zinc plating layer) at the joining face between them. Therefore, joining strength of the solid joining between the aluminum plate W1 and the steel plate W2 can be improved.

Figure 10:
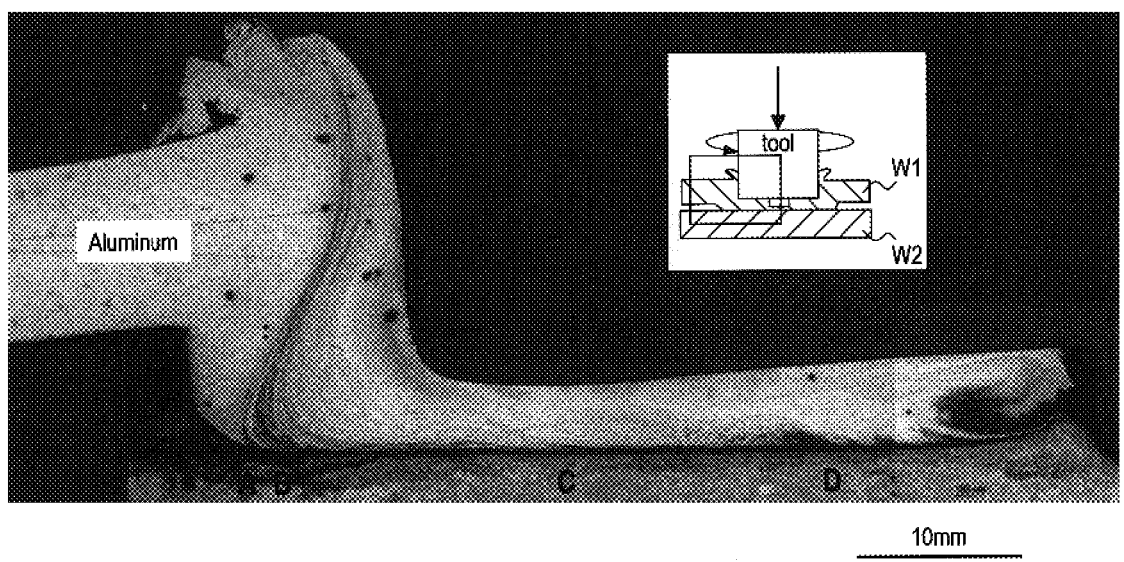
FIG. 10 is a sectional photographical view of a joining portion in which a rotating tool was inserted by 0.5 mm into a steel place with a zinc electric-plating layer.
Figure 11:
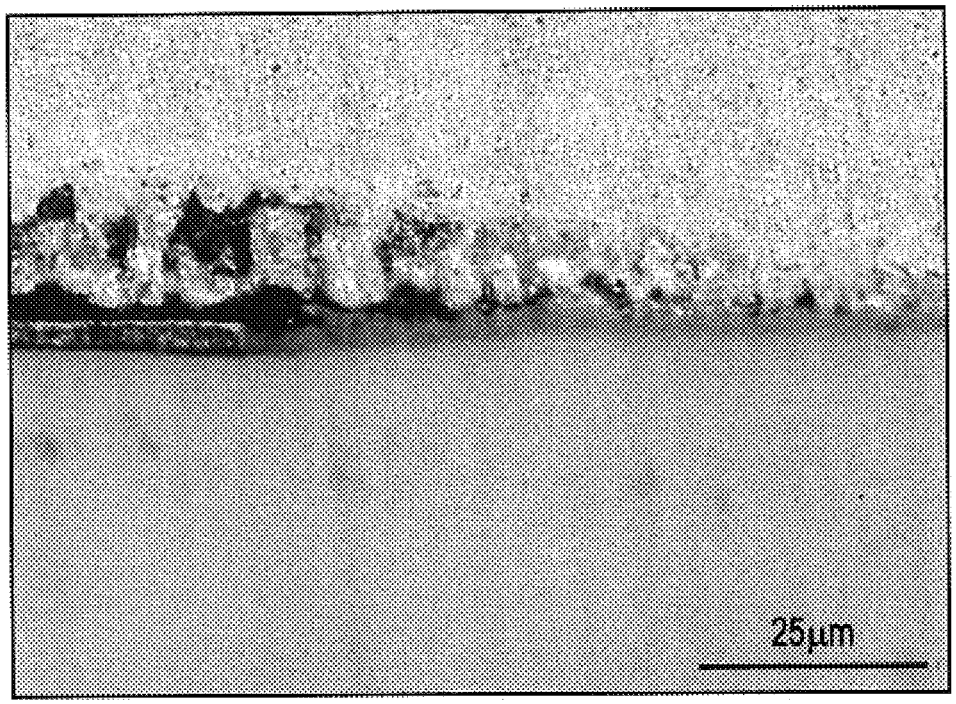
FIG. 11 is a micro-photographical view (boundary sectional photographical view of joining portion) showing around portion A of FIG. 10.
Figure 12:
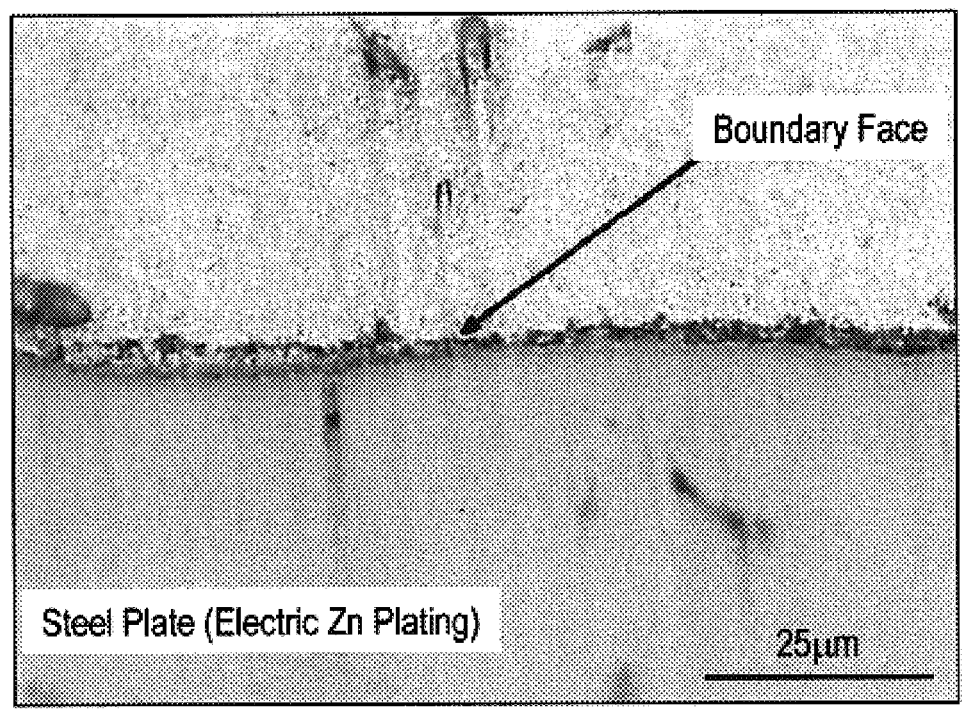
FIG. 12 is a micro-photographical view showing around portion B of FIG. 10 (boundary sectional photographical view of joining portion).
Figure 13:
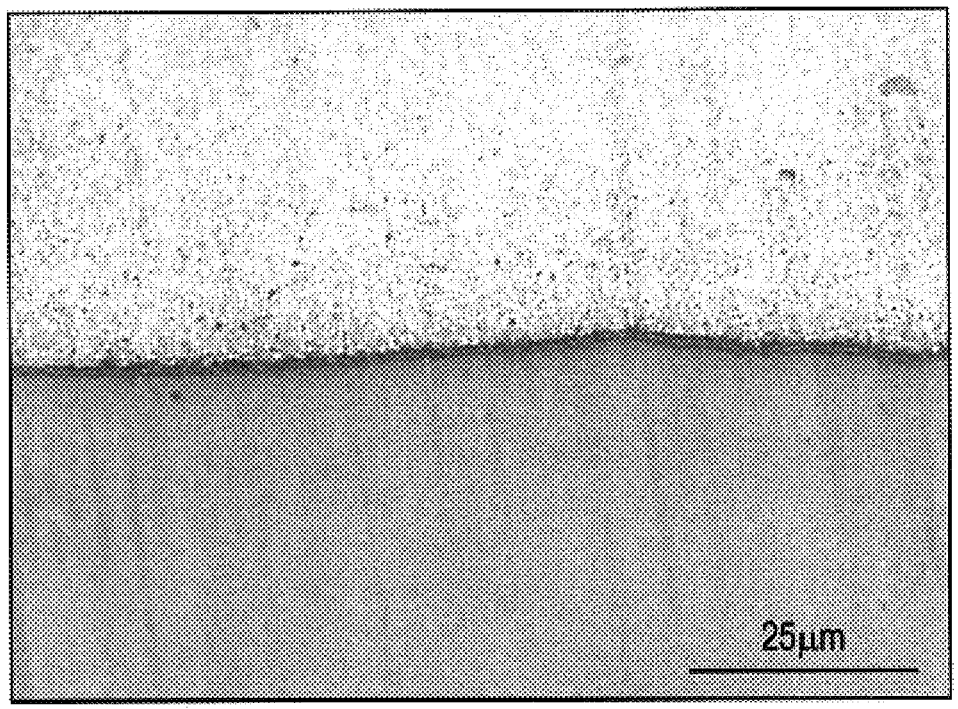
FIG. 13 is a micro-photographical view showing around portion C of FIG. 10 (boundary sectional photographical view of joining portion).
Figure 14:
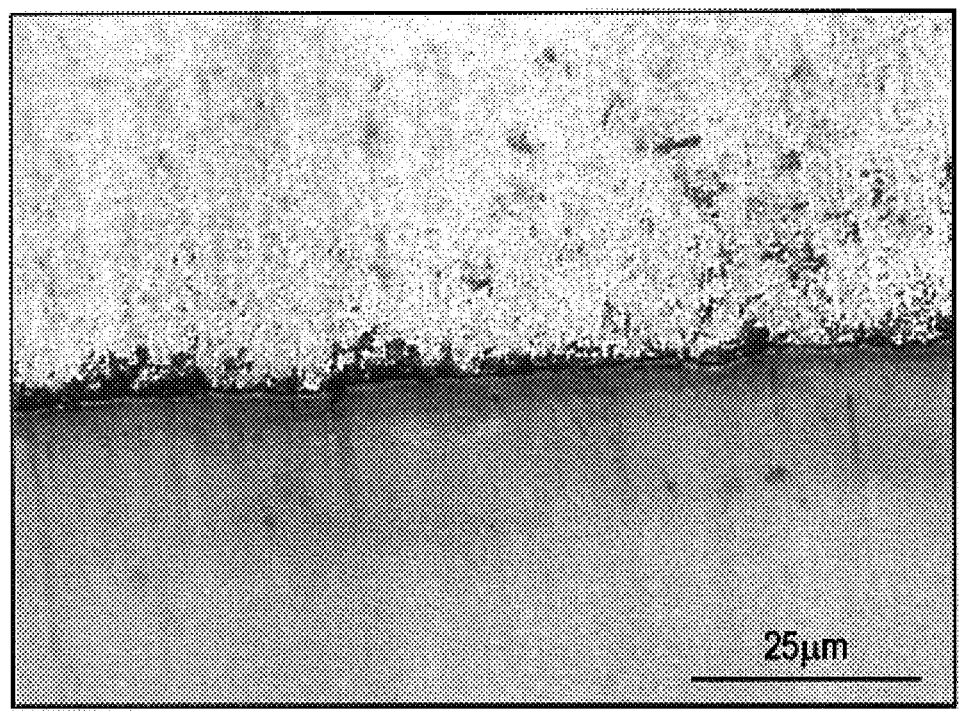
FIG. 14 is a micro-photographical view showing around portion D of FIG. 10 (boundary sectional photographical view of joining portion).

The joining state according to the above-described joining method can be observed by photographical views of FIGS. 10 though 19. FIG. 10 is a sectional photographical view (magnification: see drawing) of the joining portion in which the rotating tool 4 was inserted by 0.5 mm into the steel place with a zinc electric-plating layer (a joining portion shown herein is a part of area encompassed by a line in an upper-right drawing in FIG. 10). FIGS. 11 through 14 are micro-photographical views (magnification: see drawings) showing around portions A through D of FIG. 10. According to these views, an intermediate layer was observed at around portions A and B near an end of joining between the aluminum W1 and the steel plate W2. At around portions C and D, however, the aluminum W1 and the steel plate W2 contact directly and thereby no intermediate layer was observed.

Figure 15:
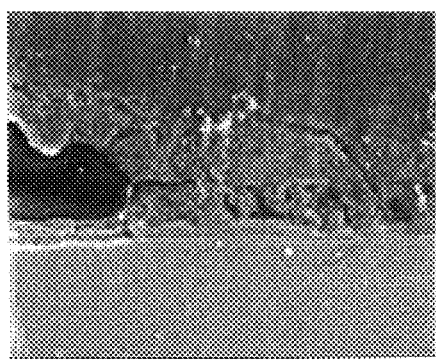
FIG. 15 is a scanning-type electron micro-photographical view showing SEM image around portion A of FIG. 10.
Figure 16:
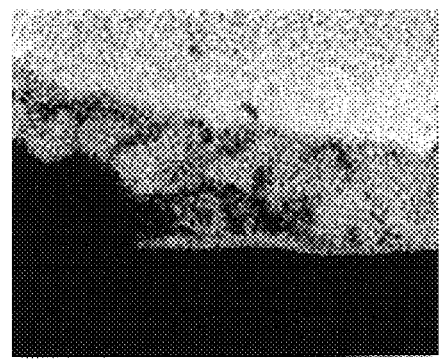
FIG. 16 is a scanning-type electron micro-photographical view showing existence of Al around portion A of FIG. 10.
Figure 17:
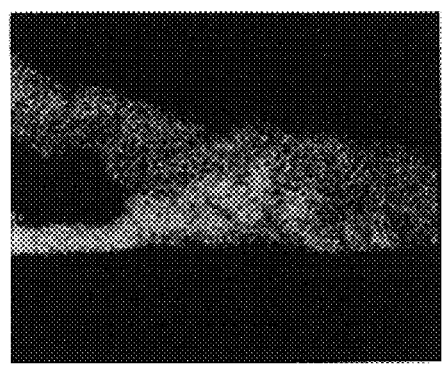
FIG. 17 is a scanning-type electron micro-photographical view showing existence of Zn around portion A of FIG. 10.
Figure 18:
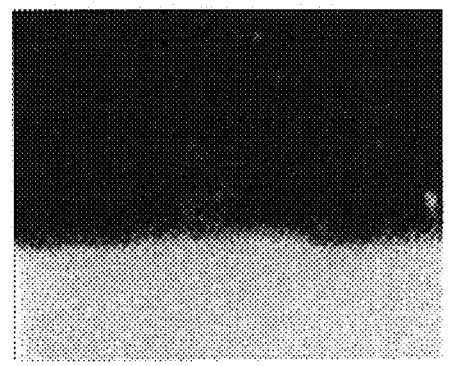
FIG. 18 is a scanning-type electron micro-photographical view showing existence of Fe around portion A of FIG. 10.
Figure 19:
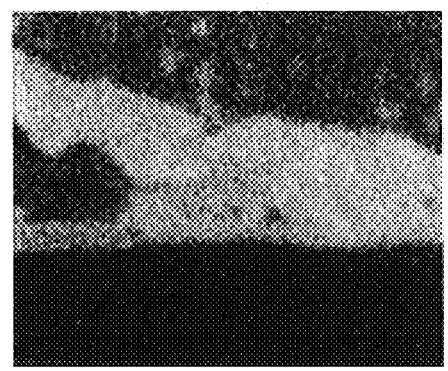
FIG. 19 is a scanning-type electron micro-photographical view showing existence of 0 around portion A of FIG. 10.

A component analysis of EPMA (Electro Probe Micro Analyzer) was conducted for the above-described intermediate layer observed at portion A. This analysis showed that the intermediate layer was comprised of a mixture of aluminum (see FIG. 16), zinc (see FIG. 17) and oxygen (see FIG. 19) as shown in FIGS. 15 (SEM image) through 19 (herein, see FIG. 18 for iron (Fe)). It is considered that this intermediate layer is part of the zinc plating which has been softened due to the frictional heat generated between the rotating tool 4 and the aluminum plate W1, and then pushed outward along with part of the basic material of aluminum according to the pressing force of the rotating tool 4.

Figure 20:
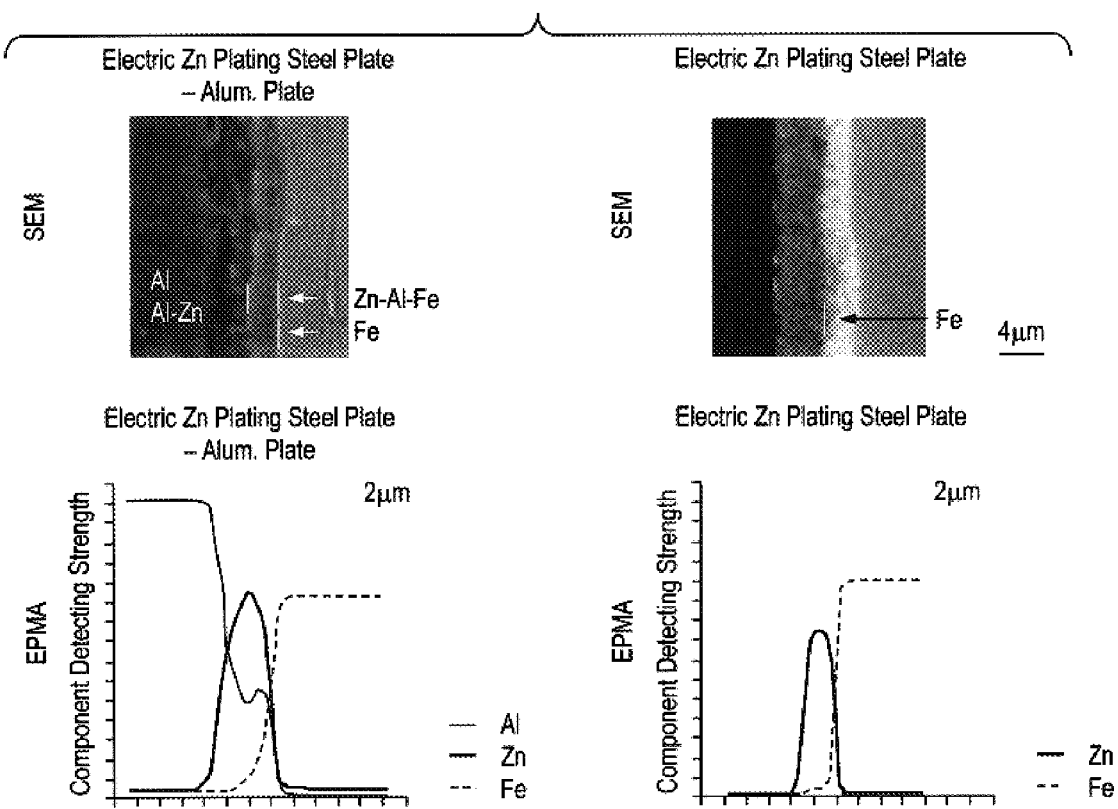
FIG. 20 is an explanatory diagraph showing a state around portion B of FIG. 10 based on a scanning-type electron micro-photographical view and a distribution of composition.

The intermediate layer which was observed at portion B is considered, according to the EPMA component analysis and FIG. 20, as a compound which is formed of aluminum, iron and zinc, wherein aluminum and iron have been diffused into the zinc plating remaining without being pushed outward.

Figure 21:
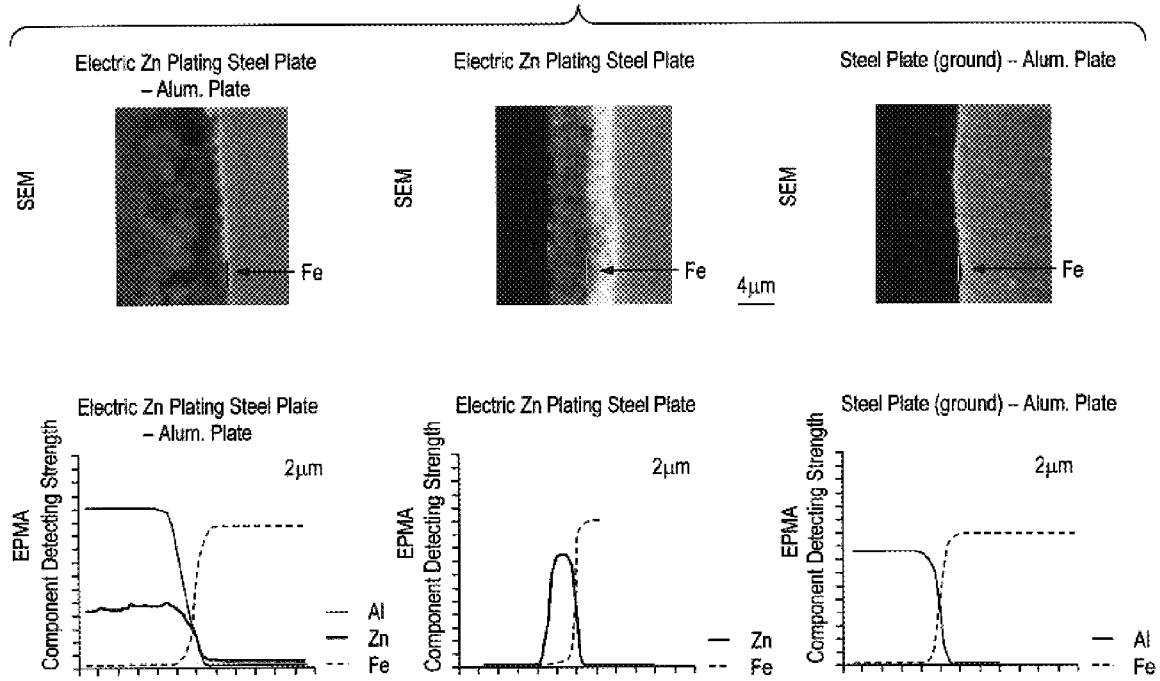
FIG. 21 is an explanatory diagraph showing a state around portion C of FIG. 10 based on a scanning-type electron micro-photographical view and a distribution of composition.

With respect to part C, it is considered according to the EPMA component analysis and FIG. 21 that part of the zinc plating was incorporated into the aluminum and the other part of the zinc plating was pushed outward by the pressing force of the rotating tool 4, so that the aluminum plate W1 (new uncovered surface) and the steel plate W2 (new uncovered surface) are contacted directly with no or little zinc plating therebetween.

The improvement of joining strength according to the above-described joining method can be observed from a presence, kinds, melting points or the like of plating. Some plating samples which are described in Table 1 was used for members to be joined, and these members WS and the aluminum plate W1 (JIS 6000-based aluminum plate) are frictional-joined under the following common testing conditions. Then, the test of tension-shear load was conducted for respective samples by the use of a tension tester to measure it as shown FIG. 22.

TABLE 1

| | No. | Kinds of Plating | Coating Weight of One Side (g/m$^2$) | Melting Point* (° C.) | Plate Thickness (mm) |
|---|---|---|---|---|---|
| Steel Plate | 1 | Melt Zn-5% Al | 90 | 382 | 0.7 |
| | 2 | Electric Zn | 30 | 419 | 0.7 |
| | 3 | Electric Zn | 30 | 419 | 0.7 |
| | 4 | Electric Zn | 60 | 419 | 0.7 |
| | 5 | Melt Zn | 60 | 419 | 0.7 |
| | 6 | Melt Al-10% Si | 30 | 577 | 0.7 |
| | 7 | Electric Zn-10% Ni | 20 | 800 | 0.7 |
| | 8 | Melt Zn-10% Fe | 60 | 950 | 0.7 |
| | 9 | — | — | [1500] | 0.7 |

TABLE 1-continued

| No. | Kinds of Plating | Coating Weight of One Side (g/m²) | Melting Point* (° C.) | Plate Thickness (mm) |
|---|---|---|---|---|
| Aluminum Plate | 10 | — | [600] | 1.0 |

Figure 23:
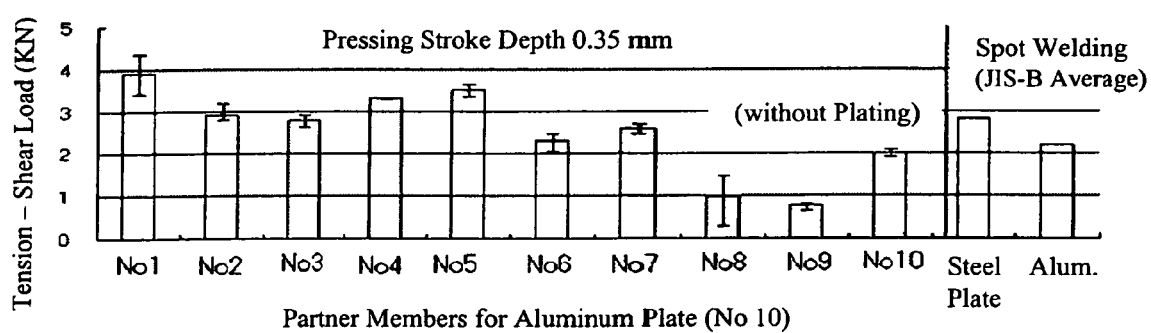
FIG. 23 is an explanatory diagraph showing a kind of plating affecting a tension-shear load.
Figure 24:
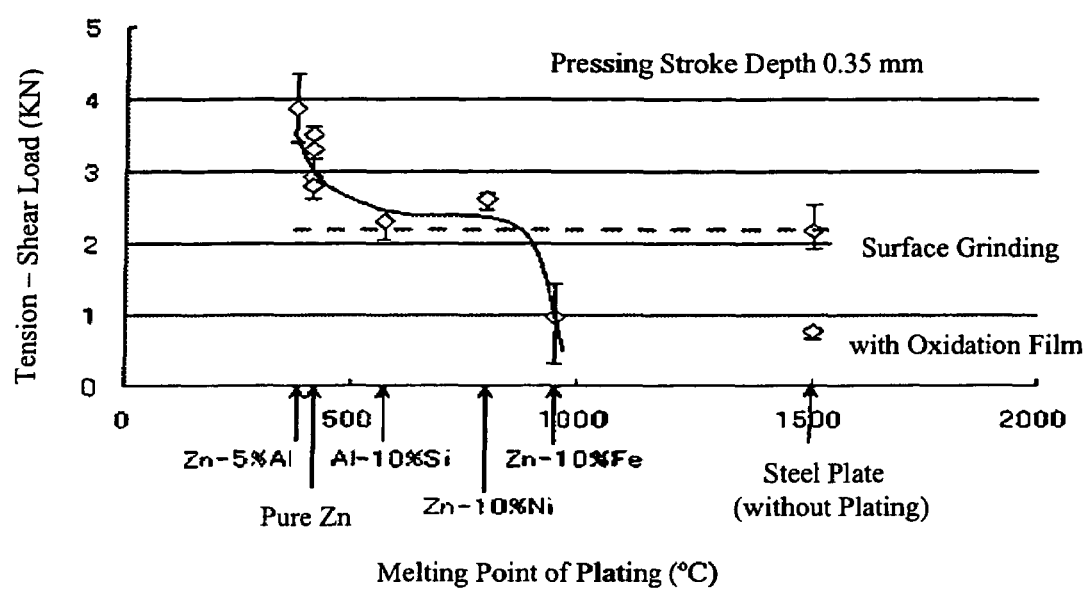
FIG. 24 is an explanatory diagraph showing a melting point of plating affecting a tension-shear load.

*a value in a bracket denotes a melting point of a base plate.
Common testing conditions
1) Shape of rotating tool: a rotating tool with a 10 mm diameter and a pin portion
2) Pressing stroke depth of rotating tool: 0.35 mm
3) Rotational speed rotating tool: 1500 rpm FIGS. 23 and 24 show results of the tests. The results of presence test of the oxidation film (iron oxide) on the steel plate showed that the metal members having no oxidation film was effective basically to improve the tension-shear load thereof. It also showed that although there was an exception on the sample with high melting point (No. 7), the lower melting point the sample of plating had with respect to the melting point of the steel plate, the higher tension-shear loads it has. The reason for this would be considered that the more easily the sample was softened due to the frictional heat by the rotating tool 4, the more easily it was pushed outward by the pressing force and plastic flow of the rotating tool 4, thereby promoting the direct solid joining of the new uncovered surfaces without any oxidation film.

Herein, as shown in FIG. 24, the sample in which the steel plate with zinc-based plating was joined showed a higher joining (shear) strength, compared with the sample in which the surface of the steel plate was ground to remove the oxidation film and then joined. The reason for this would be considered that the zinc pushed out outward from the solid joining portion made a compound with aluminum and iron, and a layer of the compound contributed to increasing a joining area, thereby increasing the joining strength.

The above improvement of the joining strength and other technical advantages according to the above-described joining method can be also observed by a comparison with a comparative sample (Japanese Laid-Open patent Publication No. 2002-66759).

1) Tension-Shear Load

Figure 22:
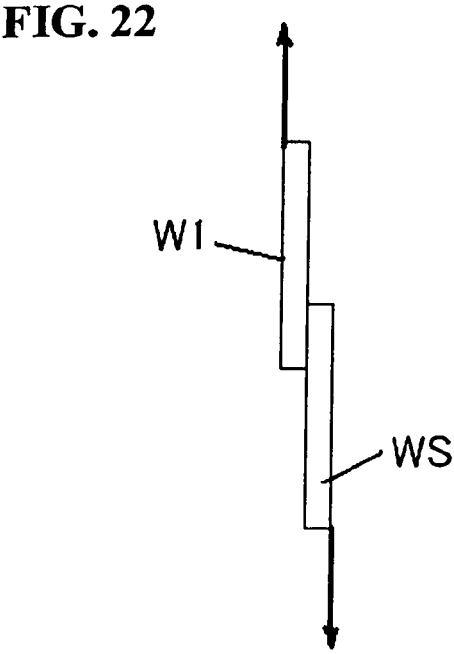
FIG. 22 is an explanatory diagraph showing a tension test method for measuring a tension-shear load (joining strength).

Firstly, in order to observe technical advantages of the above-described joining method according to the present invention, a test of measuring a tension-shear load was conducted to the joined members obtained by the above-described joining method and joined members obtained by a method according to the above comparative sample (see FIG. 22). Herein, the method according to the comparative sample was one, as described above as prior art, in which the aluminum plate W1 and the steel plate W2 were joined by an alloy material and the alloy material remained between them after joining. Specifically, there was provided a layer of the electric zinc plating between the aluminum plate W1 and the steel plate W2 by using the steel plate W2 with the electric zinc plating formed thereon, and then these plates were frictional-joined under the same conditions as the above-described joining method according to the present invention so that the plating layer can remain between them after joining. More specifically, the test was conducted under the conditions described in Table 2 and below. Herein, as described in the Table 2, a joining period of time (a period of time when the rotating tool 4 is maintained to its present position and rotation after its pressing stroke and pressing force have reached to their specified amount respectively) for the comparative sample was set at 30 seconds to induce an alloy reaction, which is considerably longer than that in the joining method according to the present invention.

TABLE 2

| | Steel Plate | | | Aluminum Plate | | Joining |
|---|---|---|---|---|---|---|
| | Kinds of Plating | Coating Weight (g/m²) | Plate Thickness (mm) | Alloy | Plate Thickness (mm) | Period of Time (sec) |
| Invention | Electric Zinc | 30 | 1.0 | 6000-based Alloy | 1.0 | 2 |
| Comparative Sample | Electric Zinc | 30 | 1.0 | 6000-based Alloy | 1.0 | 30 |

Figure 25:
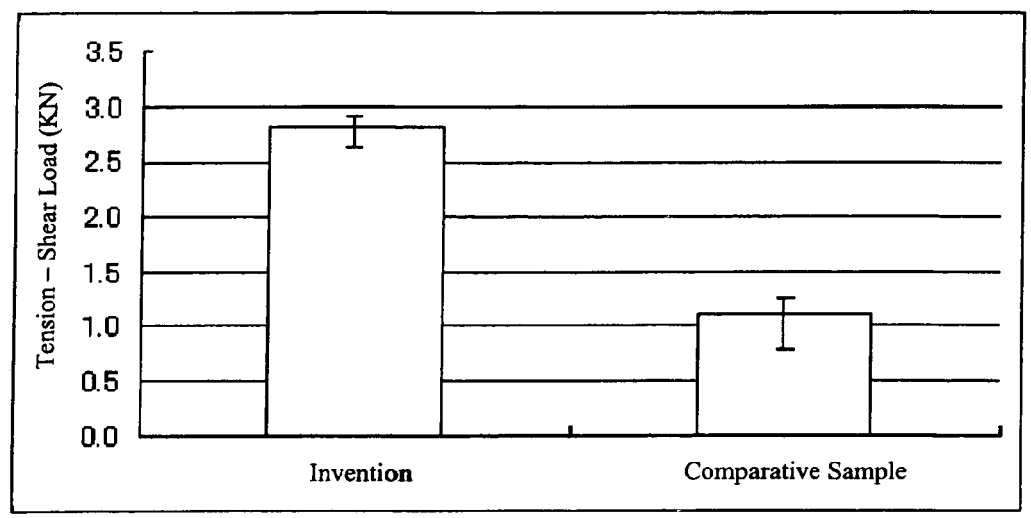
FIG. 25 is a diagraph showing comparison between a tension-shear load (joining strength) according to a joining method of the present invention and a tension-shear load (joining strength) according to a comparative sample.

Common testing conditions
Front end diameter of rotating tool: 10 mm
Rotational speed of rotating tool: 2000 rpm
Pressing stroke of rotating tool: 20% of plate thickness for the invention
5% of plate thickness for the comparative sample Results of the test is shown in FIG. 25 and showed that the present invention had a extremely high tension-shear load than the above comparative sample and thus it was superior to the comparative sample.

2) Joining Period of Time (a Period of Time when the Rotating Tool 4 is Maintained to its Present Position and Rotation After its Pressing Stroke and Pressing Force Have Reached to Their Specified Amount Respectively)

Figure 26:
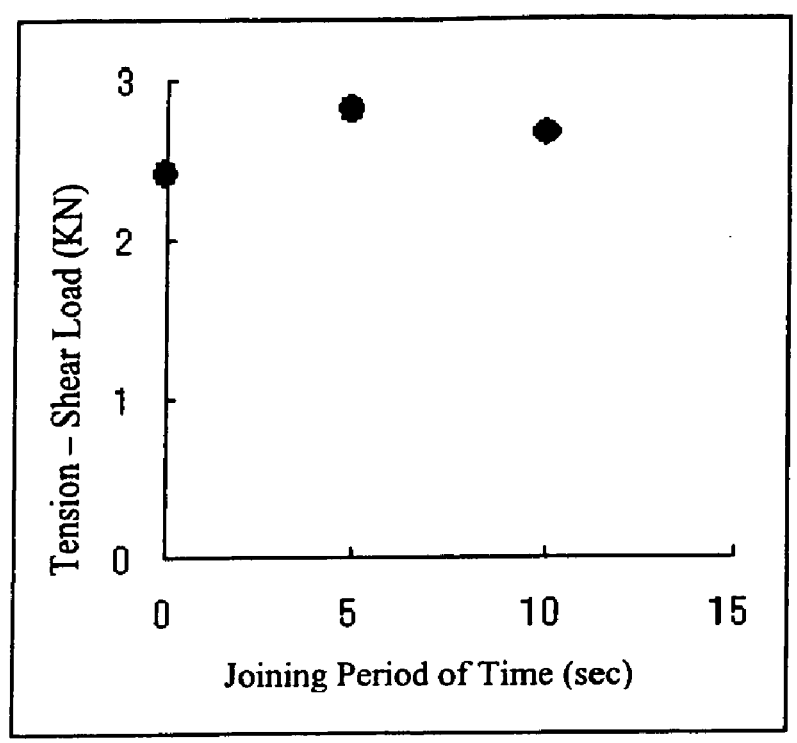
FIG. 26 is a diagraph showing relationships between a joining period of time and a tension-shear load (joining strength) according to the joining method of the present invention.

The joining method according to the present invention, as shown in FIG. 26, showed characteristics that a preferable joining strength can be obtained from the beginning (0 second) and the preferable joining strength hardly changed even if the joining period was extended. Specifically, the period of time of 0-10 seconds may be preferable, taking account of productivity. In contrast, the above-described comparative sample (Japanese Laid-Open patent Publication No. 2002-66759) needed 20 seconds or more of joining period of time for an alloy reaction. Accordingly, the joining method according to the present invention is superior to the comparative sample in productivity.

The joining method according to the present invention had its preferable scope in the use thereof under the following conditions.

1) Pressing Stroke of Rotating Tool

Figure 27:
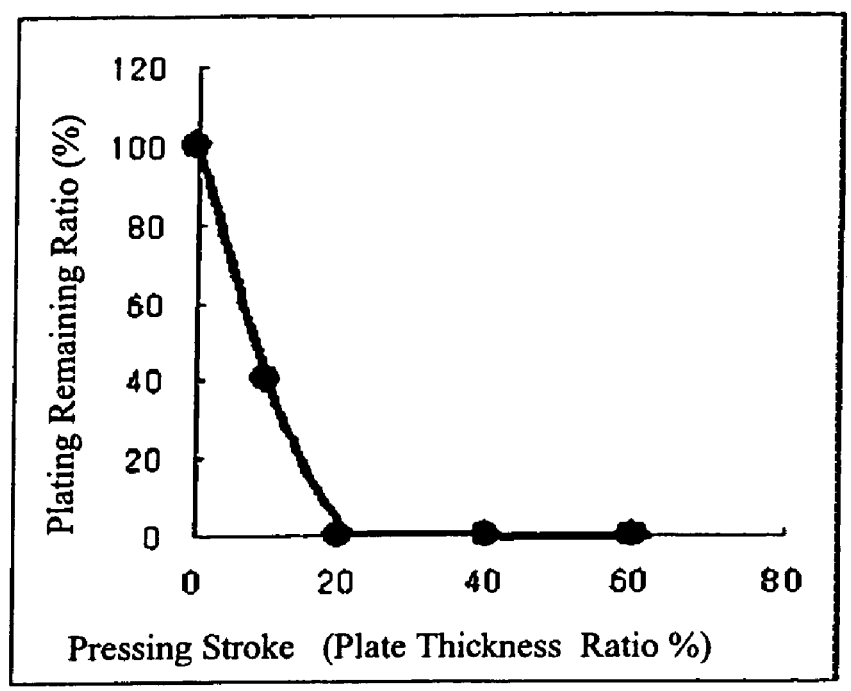
FIG. 27 is a diagraph showing relationships between a pressing stroke and a existent rate of plating according to the joining method of the present invention.

The pressing stroke of 10%, preferably 20% or more with respect to the thickness of the base plate (the aluminum plate W1 of the present embodiment) was acceptable as shown in FIG. 27. In the event that the pressing stroke was set at about 10% or more of the base plate's thickness, the plating layer of 50% or more could be eliminated in the joining method according to the present invention, which could be acceptably enough to provide a acceptable joining strength. Meanwhile, in the event that the pressing stroke was set at about 20% or more of the base plate's thickness, almost 100% of the plating layer could be eliminated to provide a high joining strength.

Figure 28:
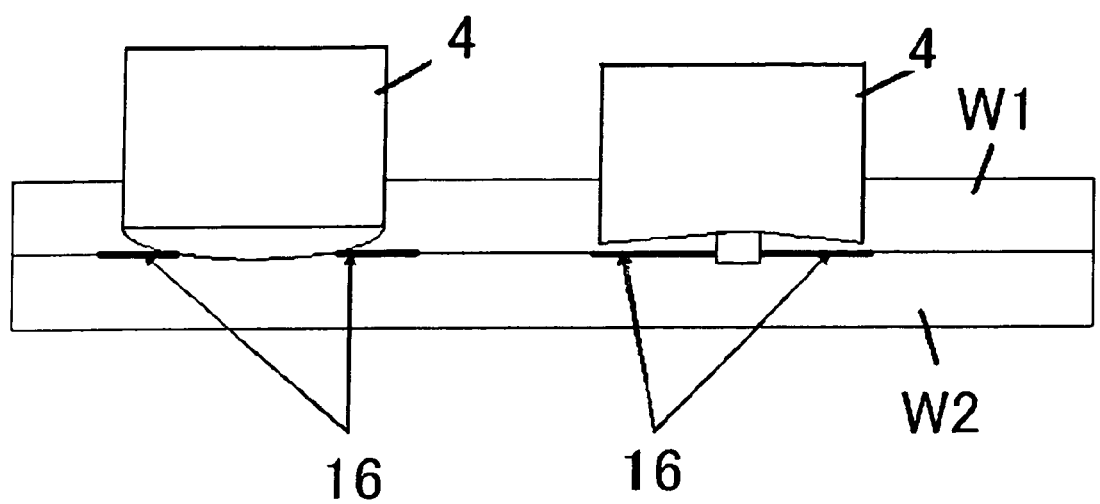
FIG. 28 is a diagraph showing an upper limit of the pressing stroke according to the joining method of the present invention.

With respect to a maximum limit of the pressing stroke, it is preferred that the rotating tool 4 dose not reach to contact the lower plate (the steel plate W2 of the present embodiment) in order to avoid wear or damage thereof. Herein, even if the rotating tool 4 contacts the lower plate W2, it may be possible to maintain the joining strength at a preferable level by providing a doughnut-shaped joining face 16 with a specified area (joining of new uncovered surfaces of the plates) between the upper plate W1 and the lower plate W2 as shown in FIG. 28. Accordingly, an amount of the pressing stroke does not necessarily correspond to the maximum limit of the acceptable pressing stroke.

2) Rotational Speed of Rotating Tool

Table 3 shows results of a test which was conducted to investigate relationships between the rotational speed and the pressing stroke of the rotating tool 4 under the following conditions. A standard described in Table 4 was used for evaluating the results.

TABLE 3

| Pressing Stroke | Rotational Speed (rpm) | | | | |
|---|---|---|---|---|---|
| (%) | 400 | 750 | 1500 | 2500 | 3500 |
| 60 | • | • | • | • | • |
| 35 | • | • | • | • | • |
| 20 | ○ | ○ | • | • | • |
| 10 | x | ○ | ○ | • | • |
| 5 | x | x | x | x | x |

TABLE 4

| Symbol | Level of Strength |
|---|---|
| • | Good (2 KN or more) |
| ○ | Lower limit level (1-2 KN) |
| x | Less than lower limit level (1 KN or less) |

The results of Table 3 showed that a high rotational speed (for example, 1500 rpm or more) of the rotating tool 4 would not be necessarily needed by providing a proper pressing stroke of that. Accordingly, the joining method according to the present invention was superior to the above-described comparative sample which needed a high rotational speed to generate the frictional heat with high temperature for alloy reaction in terms of an economical efficiency or the like.

The preferred embodiments of the present invention has been described above, but the present invention is not limited to the above. The present invention may include the following alternatives or modified embodiments as well.

1) Plating layer is also formed on the aluminum plate W1 to prevent an oxidation film from generating on the surface of the aluminum plate W1.

2) Instead of forming the zinc plating layer (oxidation-prevention layer) on the steel plate W2 (another of metal members), an oxidation film which have been formed on the surface of the steel plate W2 is removed from the surface of the steel plate W2 by a surface grinding work step or the like.

3) The metal members to be joined are comprised of three metal members or more.

Objects of the present invention should not be limited to what was described explicitly here. Instead, to provide anything which was described substantially as preferable or advantageous ones should be included implicitly in objects of the present invention.

What is claimed is:

1. A frictional joining method, in which different kinds of plural metal members are joined by lapping the metal members, comprising the steps of:

providing said different kinds of plural metal members to be joined;

forming a metal film having an oxidation-prevention function on a surface of at least one of said metal members which constitutes a joining face between said metal members;

lapping said metal members in such a manner that said metal film having oxidation-prevention function is located at the joining face between said metal members;

placing a rotating tool on an outside surface of a lapped portion of one of said metal members;

joining said metal members by applying a rotational force and a pressing force to said rotating tool, said rotational force being applied around a pressing axis of said rotating tool, said pressing force being applied toward another of said metal members which is joined to said one of metal members on which said rotating tool is placed, wherein said step of joining the metal members includes a step of softening said metal film having oxidation-prevention function located at the joining face between the metal members by the use of frictional heat generated by a rotation of said rotating tool, and a step of pushing out said softened metal film having oxidation-prevention function outward by the use of said pressing force applied to said rotating tool, wherein said pressing force of the rotating tool is adjusted by a pressing stroke of said rotating tool which is moved toward said another of metal members, and said step of pushing out said softened metal film outward is executed by increasing said pressing stroke more than that in said step of softening the metal film, wherein said increasing of the pressing stroke of the rotating tool in said step of pushing out the softened metal film outward is adjusted so as to provide the pressing force that is large enough to push out substantially all of said softened metal film outward such that respective new uncovered surfaces of said metal members directly contact each other, whereby said metal members are joined in a solid state substantially without said metal film having oxidation-prevention function and with a direct contact of the new uncovered surfaces of the metal members at the joining face between the metal members.

2. The frictional joining method of claim 1, wherein said another of metal members has a relatively higher melting point than that of said one of metal members on which said rotating tool is placed, and said metal film having oxidation-prevention function is formed on said another of metal members and its melting point is lower than that of said another of metal members.

3. The frictional joining method of claim 2, wherein said melting point of the metal film is lower than that of said one of metal members.

4. The fictional joining method of claim 2, wherein said metal film is further formed on said one of metal members.

5. The frictional joining method of claim 1, wherein said one of metal members is made of aluminum and said another of metal members is made of steel.

6. The frictional joining method of claim 5, wherein said metal film is formed on said another of metal members made of steel.

7. The frictional joining method of claim 6, wherein said metal film is not formed on said one of metal members made of aluminum.

8. The frictional joining method of claim 6, wherein said metal film is formed of a zinc-based plating layer.

9. The frictional joining method of claim 1, wherein said rotating tool includes a substantially cylindrical body portion and a pin portion which protrudes from a center of a tip of said body portion and has centering function, and there is provided a concave at an end surface of said tip of the body portion such that a depth of the concave is deeper at its central portion.

10. The frictional joining method of claim 1, wherein an oxidation film which has been formed on a surface of said one of metal members which constitutes the joining face between said metal members is destroyed due to an operation of said rotating tool in said step of joining the metal members, whereby said metal members are joined in a solid state substantially without said metal film having oxidation-prevention function and any oxidation film at the joining face between the metal members.

* * * * *